United States Patent [19]

Reime

[11] Patent Number: 5,173,812
[45] Date of Patent: Dec. 22, 1992

[54] VIDEORECORDER FOR ADDING DATA SIGNALS ON PREVIOUSLY RECORDED SIGNALS, HAVING PLAYBACK SIGNAL PHASE COMPARATOR MEANS

[75] Inventor: Gerd Reime, Schömberg, Fed. Rep. of Germany

[73] Assignee: Nokia (Deutschland) GmbH, Fed. Rep. of Germany

[21] Appl. No.: 688,633

[22] Filed: Apr. 19, 1991

[30] Foreign Application Priority Data

May 7, 1990 [DE] Fed. Rep. of Germany ....... 4014513

[51] Int. Cl.[5] ........................................... H04N 5/782
[52] U.S. Cl. .................. 360/14.1; 360/33.1; 358/311; 358/335
[58] Field of Search ............... 358/335, 320, 337, 311; 360/33.1, 19.1, 72.1, 72.2, 14.1, 14.2, 13

[56] References Cited

U.S. PATENT DOCUMENTS

| | | |
|---|---|---|
| 3,176,067 | 3/1965 | Machein et al. |
| 4,175,267 | 11/1979 | Tachi ................................. 360/72.2 |
| 4,575,772 | 3/1986 | Shimada et al. .................... 360/191 |
| 4,734,792 | 3/1988 | Maeda et al. ....................... 358/335 |

FOREIGN PATENT DOCUMENTS

| | | |
|---|---|---|
| 2711920 | 10/1977 | Fed. Rep. of Germany . |
| 2844897 | 4/1980 | Fed. Rep. of Germany . |
| 3006735 | 11/1980 | Fed. Rep. of Germany . |
| 3042679 | 5/1981 | Fed. Rep. of Germany . |
| 3315740 | 11/1984 | Fed. Rep. of Germany . |
| 3738336 | 3/1989 | Fed. Rep. of Germany . |
| 3806330 | 9/1989 | Fed. Rep. of Germany . |

OTHER PUBLICATIONS

English Translations of Abstracts.

*Primary Examiner*—Tommy P. Chin
*Assistant Examiner*—Huy Nguyen
*Attorney, Agent, or Firm*—Ware, Fressola, Van Der Sluys & Adolphson

[57] ABSTRACT

A video recorder having recording/reproducing apparatus for subsequent recording of data signals in defined video lines of a previously recorded signal existing on a magnetic tape. The recording/reproducing apparatus (10, 11, 12, 19, 20) records FM signals onto the magnetic tape and reads previously recorded FM signals from the magnetic tape. A voltage controlled oscillator VCO (13) is connected between a data signal input terminal (16) and a recording terminal (11), for converting data signals routed to the data input terminal (16) into FM data signals. A switch (14) is connected between the recording terminal (11) and a VCO (13) output, for switching the recording terminal (11) to the VCO (13) output for the duration of the recording mode of the data recording apparatus. A circuit (17) detects a line sync signal (22) of the video lines passing through the data recording apparatus, for switching the recording/reproducing apparatus from recording mode to reproducing mode immediately before the end of a video line, and for switching from the reproducing mode to the recording mode immediately after detection of the line sync signal (22). A phase comparator circuit (23) has phase comparator inputs, one connected to the VCO (13) output and another to the reproducing output (12), for generating a phase deviation signal for the VCO (13) input and for setting an in-phase oscillation of the VCO (13) with the oscillation picked up by the phase comparator circuit (23). A data signal switch (18) has the VCO (13) input connected either to the output of the phase comparator circuit (23), or to the data signal recording apparatus input terminal (16) for the duration of the recording mode of the data signal recording apparatus.

3 Claims, 1 Drawing Sheet

VIDEORECORDER FOR ADDING DATA SIGNALS ON PREVIOUSLY RECORDED SIGNALS, HAVING PLAYBACK SIGNAL PHASE COMPARATOR MEANS

BACKGROUND OF THE INVENTION

1. Field of the Invention

The present invention concerns a videorecorder with which it is possible to add further information to information already recorded on a magnetic tape. As a general rule this is done in such sections of the recording tracks that are not correlated with visible lines.

2. Description of the Prior Art

When information has to be added to information already recorded on a magnetic tape, one has to keep on switching from a playback mode to a recording mode and viceversa. In the playback mode of operation one ascertains when a horizontal synchronization pulse occurs to indicate the beginning of the recording section for a line. The equipment is then switched to the recording mode for a pregiven period of time. Shortly before one can expect the next horizontal synchronization pulse, the equipment is switched back to the playback mode, thereby making it possible to detect this pulse. This switching is associated with signal disturbances that could lead to playback errors when the added information has to be read on a subsequent occasion. With a view to avoiding these reading errors to the greatest possible extent, it is a common practice not to commence the recording of the added data immediately after the switching, but to record at first only the unmodulated FM carrier, subsequently modulating this carrier with data recording signals after the lapse of a waiting period of the order of 20–30 $\mu$sec. The disturbances caused when switching from the playback mode to the recording mode will not therefore have any effect when the information is subsequently played back. But there is the compensating drawback that considerable recording capacity is lost.

The above remarks make it clear that for considerable time past there has existed the problem of defining a videorecorder that would make it possible to record information on a tape that already carries other information and to do this in a manner reasonably free of disturbances.

SUMMARY OF THE INVENTION

The videorecorder according to the present invention has the following features:
a recording-reproducing head for recording FM signals on a magnetic tape and for reproducing (reading) the recorded FM signals,
a VCO that is connected to a data input terminal,
a phase comparator that, in a playback mode of operation, compares the phase of the read signals with that of the VCO output signal and produces an integrated actuator (deviation-from-the-rule) signal as the phase comparator output signal, and
a switching device so designed as to enable it to
switch selectively between the recording mode and the playback mode,
switch selectively between the video recording signals and the modulated data signals from the VCO,
switch the phase comparator output signal to the input end of the VCO when the instrument is operated in the playback mode, and
switch the data recording signals to the input end of the VCO when the instrument is operating in the recording mode and data signals have to be recorded.

The present invention is underlain by the insight that the disturbance signals hitherto observed when recording additional information on a tape derive, above all, from the fact that—when the recorder is switched from the playback mode to the recording mode—the modulated data recording signals are not in phase with the previously recorded signals read up to that moment. On subsequent playback, the phase jump between the previously recorded and the subsequently added signals has the effect of producing a temporary breakdown of the demodulator employed to demodulate the modulated FM signal read from the tape.

In the videorecorder according to the present invention, on the other hand, the VCO, which serves to convert the data recording signals into FM signals, is kept continuously in phase with the signals read from the tape while the instrument is in the playback mode. If the instrument is then switched to the recording mode, the recording of the additional information therefore takes place without any phase jump as compared with the previously recorded FM signal. Although minor switching disturbances can still occur when the instrument is switched from one mode to the other, phase jumps are now impossible. The minor switching disturbances do not inhibit the proper functioning of a customary demodulator. Consequently, it is possible to commence the recording of additional data as soon as the instrument has been switched from the playback mode to the recording mode. Given the undisturbed operation of the demodulator, this information can be read in an error-free manner right from the beginning. The available recording capacity can therefore be exploited to the full.

DETAILED DESCRIPTION OF THE PREFERRED EMBODIMENT

Figure 1:
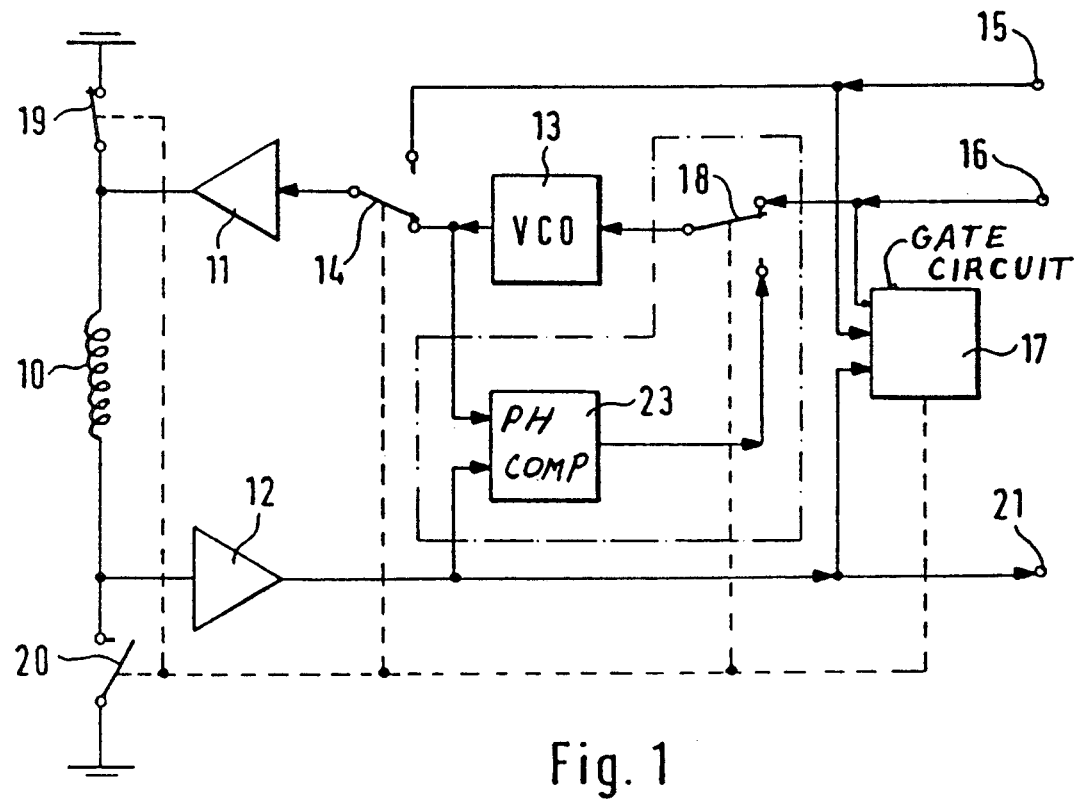
FIG. 1 shows the block diagram of a videorecorder that can be switched from the playback mode to the recording mode without the signal suffering a phase jump.

The block diagram of Figure shows the various function groups or components of a videorecorder that are of importance for the purposes of the explanations to be given hereinbelow. The circuit contains a coil 10 of a recording-reproducing head, and this coil will either receive FM signals for recording via a recording signal amplifier 11 or emit the signals read from the tape via a playback signal amplifier 12. The signals to be recorded are supplied via a recording signal switch 14 either from a video terminal 15 or via a VCO 13 from a data signal terminal 16. The recording signal switch 14 is part of a switching device that also comprises a gate circuit 17, a data signal switch 18, a playback earthing switch 19, and a recording earthing switch 20.

The circuit so far described is wholly identical with traditional circuits of this type. When the data signal switch 18 is kept permanently in the position shown in FIG. 1, a position in which it will supply data recording signals from the data signal switch 18 to the VCO 13, the circuit will have exactly the same function as a traditional circuit. This function will now be described in some detail.

When the recorder is in the recording mode, the recording earthing switch 20 is closed and the playback earthing switch 19 is open. Depending on the position of the recording signal switch 14, the recording head will receive either the videosignals applied to the videosignal input terminal 15 or data signals applied to the data signal input 16 and subsequently modulated by the VCO 13, these signals being recorded on a tape not shown in the figure. In the playback mode, on the other hand, the playback earthing switch 19 is closed and the recording earthing switch 20 is kept open. Playback signals will then be supplied via the playback signal amplifier 12 to an output terminal 21.

When additional information has to be inserted in previously recorded information, the recorder will be continuously switched from the playback mode to the recording mode and viceversa, this result being obtained by means of appropriate switching of the playback earthing switch 19 and the recording earthing switch 20. This continuous switching to and from is quite essential, because one has to avoid overwriting the recorded synchronization signals. If this is to be ensured, one must first detect these synchronization signals in the playback mode. Immediately after the synchronization signal, the instrument is switched to the recording mode, which is then abandoned just before the time when the next synchronization signal is to be expected. This can be illustrated by reference to FIG. 2.

Figure 2:
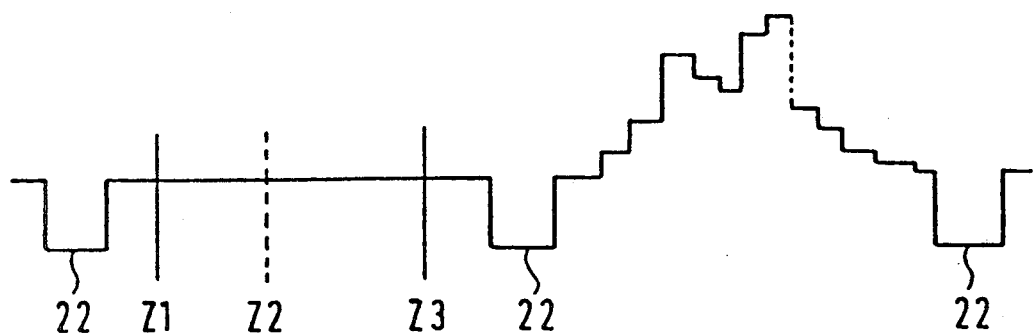
FIG. 2 shows a schematic diagram of the voltage pattern of a recorded signal (but as a level diagram rather than an FM signal diagram).

FIG. 2 shows the level pattern of an already recorded signal plotted as a function of time. The levels have their counterparts in effectively different wavelengths of an FM signal. At regular intervals of time this signal will contain the horizontal synchronization pulse 22. When recording in conformity with the NSTC standard, there will be an interval of 64 μsec between one pulse and the next. No information is recorded between the first two horizontal synchronization pulses 22 in FIG. 2. We are here concerned with the section for a nonvisible line. The interval between the second and the third pulse, on the other hand, contains information for a visible line. The two continuous vertical lines in FIG. 2 indicate the interval of time in which additional information can subsequently be recorded in the track section for the non-visible line. The associated moments of time are designated as Z1 and Z3 in FIG. 2.

When such additional data information is subsequently recorded, the recording data switch 14 and the data signal switch 18 will be permanently in the positions shown in FIG. 1. When time Z1 is reached, the two earthing switches are reversed, thereby switching from the playback mode to the recording mode. When this switchover is effected, there will normally be a phase jump in the recorded FM signal. Unless the phase difference between the previously recorded FM signal and the additional data signal happens to be very small, the resulting phase shift will have the effect of temporarily disrupting the demodulator during the subsequent reading of the signals. The procedure adopted in the present state of the art is therefore to avoid modulating the carrier with the additional data signal immediately after the switchover and commencing this operation only with a certain delay. This later point of time is designated as Z2 in FIG. 2. It can readily be seen that the fact that modulation of the recording signal cannot be commenced at Z1 causes the loss of a great deal of recording capacity.

The circuit according to FIG. 1 avoids the problem that has just been discussed by virtue of the fact that it also comprises the function groups shown in FIG. 1 within the area bounded by the chain-dotted line. The groups in question are a phase comparator 23 ad the previously mentioned data signal switch 18. This switch is not included in the traditional circuit, because the data recording signals are there supplied continuously from the data si input terminal 16 to the VCO 13. The phase comparator 23 compares the phase of the VCO output signal with that of the signal read from the tape and supplied via the playback amplifier 12. The actuating (deviation-from-the-rule) signal is integrated and this integrated signal is then applied to the second terminal of the data signal switch 18. As already explained, the data recording signal from the data input terminal 16 is applied to the first terminal of this switch. This arrangement ensures that whenever the data signal switch 18 is switched to the phase comparator output signal, the phase of the VCO output signal will remain continuously aligned with the phase of the playback signal.

If the recording and playback signals supplied to the gate circuit 17 at the time Z1 cause the said circuit to emit the command for switching from playback operation to the recording mode, this will lead not only to the switching of the two earthing switches 19 and 20, but also to the reversal of the data signal switch 18, so that the VCO 13 will henceforth receive the data recording signal rather than the phase comparator output signal. The data recording signal as frequency-modulated by the VCO 13 will therefore continue the previously read signal in the correct phase position. When the recorded information is subsequently read from the tape, there will thus be no danger of the demodulator becoming disrupted. Signals can therefore be correctly read right from the time Z1, so that modulated data recording signals can be supplied to the VCO 13 as from the time Z1 when the switchover to the recording mode is effected without there being any danger that the additionally recorded signals will not be read correctly when they are to be played back on a later occasion.

Attention is drawn to the fact that the switching between the recording mode and the playback mode and viceversa can also be obtained with a circuit structure different from the one shown in FIG. 1. In a practical embodiment the various reversing switches will be designed as semiconductor components.

As compared with known circuits, the essential feature for the proper functioning of the circuit shown in FIG. 1 is solely that the action of the phase comparator 23 keeps the output signal of the VCO 13 continuously in phase with the previously recorded signal read from the tape. This ensures that the subsequently recorded signal will continue the signal already contained on the tape in the correct phase position.

What is claimed is:

1. A video recorder for subsequent recording of data signals in defined video lines of a recording existing on a magnetic tape, comprising:
   a recording/reproducing means (10, 19, 20) having a recording input means (11), responsive to a second switched signal, for provided recorder FM data signals onto the magnetic tape, and further having a reproducing output means (12), responsive to recorded FM data signals from the magnetic tape, for providing a playback FM data signals from the magnetic tape;

a video terminal (15), responsive to video signals;

a data signal terminal (16), responsive to data signals;

switch control means (17), responsive to the video signals, further responsive to the data signals, and still further responsive to the previously recorded FM data signal, for providing recording/reproducing control signals;

first switching means (18), responsive to the recording/reproducing control signals, further switchably responsive to either the data signals or a phase comparator output signal, for providing a first switched signal;

a voltage controlled oscillator VCO (13), responsive to the first switched signal, for providing a VCO (13) output signal;

a second switching means (14), responsive to the recording/reproducing control signals, and further switchably responsive to either the VCO (13) output signal or the video signal from the video terminal (15), for providing the second switched signal to be recorded by the recording/reproducing means (10, 19, 20);

a phase comparator circuit (23), responsive to the VCO (13) output signal, and further responsive to the previously recording FM data signal from the reproducing output mean (12) for providing the phase comparator output signal, which is switchably input into the VCO (13) by the first switching means (18) to continuously align the phase of the VCO output signal with the playback FM data signal from the magnetic tape.

2. A video recorder for subsequent recording of data signals in defined video liens of a recording existing on a magnetic tape, comprising:

a recording/reproducing apparatus (10, 11, 12, 19, 20) for recording FM signals onto a magnetic tape and for reading previously recording FM signals from the magnetic tape;

a voltage controlled oscillator VCO (13) connected between a data signal input terminal (16) and a recording terminal (11) of the recording/reproducing apparatus (10, 11, 12, 19, 20), for converting the data signals routed to the data input terminal (16) into FM data signals;

a switching device means (14, 17) having a switch (14) connected between the recording terminal (11) and an output of the voltage controlled oscillator VCO (13), for switching the recording terminal (11) to the output of the voltage controlled oscillator VCO (13) for the duration of the recording mode of the data recording/reproducing apparatus (10, 11, 12, 19, 20), and a circuit (17) for detection of line sync signals of the video lines passing through the data recording/reproducing apparatus (10, 11, 12, 19, 20) and, for the duration of the recording mode of the data recording/reproducing apparatus (10, 11 12, 19, 20), for switching the recording/reproducing apparatus (10, 11, 12, 19, 20) from recording mode to reproducing mode immediately before the end of the video line and from the reproducing mode to the recording mode immediately after detection of a line sync signal (22);

a phase comparator circuit (23) having phase comparator inputs connected to the output of the voltage controlled oscillator VCO (13) and to the reproducing output (12), for generating a phase deviation signal for the input of the voltage controlled oscillator VCO (13) and for setting an in-phase oscillation of the voltage controlled oscillator VCO (13) with the oscillation picked up by the phase comparator circuit (23); and a data signal switch (18) for connecting the input of the voltage controlled oscillator VCO (13) either to an output of the phase comparator circuit (13), or to the data signal input terminal (16) for the duration of the recording mode of the data signal recording/reproducing apparatus (10, 11, 12, 19, 20).

3. A video recorder as claimed in claim 2, wherein the circuit (17) includes a sync separator to detect line sync pulses, and to provide line sync signals.

* * * * *

UNITED STATES PATENT AND TRADEMARK OFFICE
CERTIFICATE OF CORRECTION

PATENT NO. : 5,173,812
DATED : December 22, 1992
INVENTOR(S) : G. Reime

It is certified that error appears in the above-identified patent and that said Letters Patent is hereby corrected as shown below:

At column 4, line 65, please change "provided recorder" to --providing recorded--.

At column 5, line 28, please insert a comma after "(12)".

At column 5, line 35, please change "liens" to --lines--.

Signed and Sealed this

Eighth Day of March, 1994

Attest:

BRUCE LEHMAN

Attesting Officer

Commissioner of Patents and Trademarks